United States Patent
Thiessen et al.

[19]

[11] Patent Number: 6,097,572
[45] Date of Patent: Aug. 1, 2000

[54] TAPE DRIVE HEAD CLEANING CARTRIDGE HAVING A CLEANING ELEMENT WITH CLEANING SEGMENTS EXTENDING ABOVE AND BELOW A CLEANING TAPE

[75] Inventors: Jeffrey S. Thiessen, Champlin; John M. Enga, Rogers, both of Minn.

[73] Assignee: Geneva Group of Companies, Inc., Minneapolis, Minn.

[21] Appl. No.: 09/136,179

[22] Filed: Aug. 19, 1998

Related U.S. Application Data

[63] Continuation-in-part of application No. 09/015,869, Jan. 29, 1998.

[51] Int. Cl.[7] .................................................. G11B 5/41
[52] U.S. Cl. ............................................................ 360/128
[58] Field of Search ................................ 360/128; 369/71

[56] References Cited

U.S. PATENT DOCUMENTS

| | | |
|---|---|---|
| 3,647,990 | 3/1972 | Eul, Jr. et al. . |
| 3,861,619 | 1/1975 | Wolff . |
| 4,388,663 | 6/1983 | Becella .................................... 360/128 |
| 4,408,243 | 10/1983 | Bonner et al. . |
| 4,470,089 | 9/1984 | Hutchins et al. . |
| 4,573,091 | 2/1986 | Barton, Jr. et al. . |
| 4,616,283 | 10/1986 | Clausen et al. . |
| 4,692,830 | 9/1987 | Willburger . |
| 4,698,712 | 10/1987 | Fritsch . |
| 4,811,149 | 3/1989 | Clausen . |
| 4,941,065 | 7/1990 | Fritsch ..................................... 360/128 |
| 5,012,376 | 4/1991 | Joannou et al. ......................... 360/128 |
| 5,021,911 | 6/1991 | Kingsbury . |
| 5,113,301 | 5/1992 | Huang ..................................... 360/128 |
| 5,461,529 | 10/1995 | Clausen ................................... 360/128 |
| 5,541,794 | 7/1996 | Griffen et al. .......................... 360/128 |
| 5,742,461 | 4/1998 | Benson et al. . |

FOREIGN PATENT DOCUMENTS 61-120320  6/1986  Japan .

*Primary Examiner*—William R. Korzuch
*Attorney, Agent, or Firm*—Moore & Hansen

[57] ABSTRACT

A cleaning cartridge for cleaning the read/write head of a tape drive having at least one stationary cleaning device with filaments, fibers or strands positioned to loosen and remove debris from the air bleed slots of the read/write head. The cleaning cartridge cleans the air bleed slots at the same time as cleaning the tape contact surface of the read/write head.

8 Claims, 2 Drawing Sheets

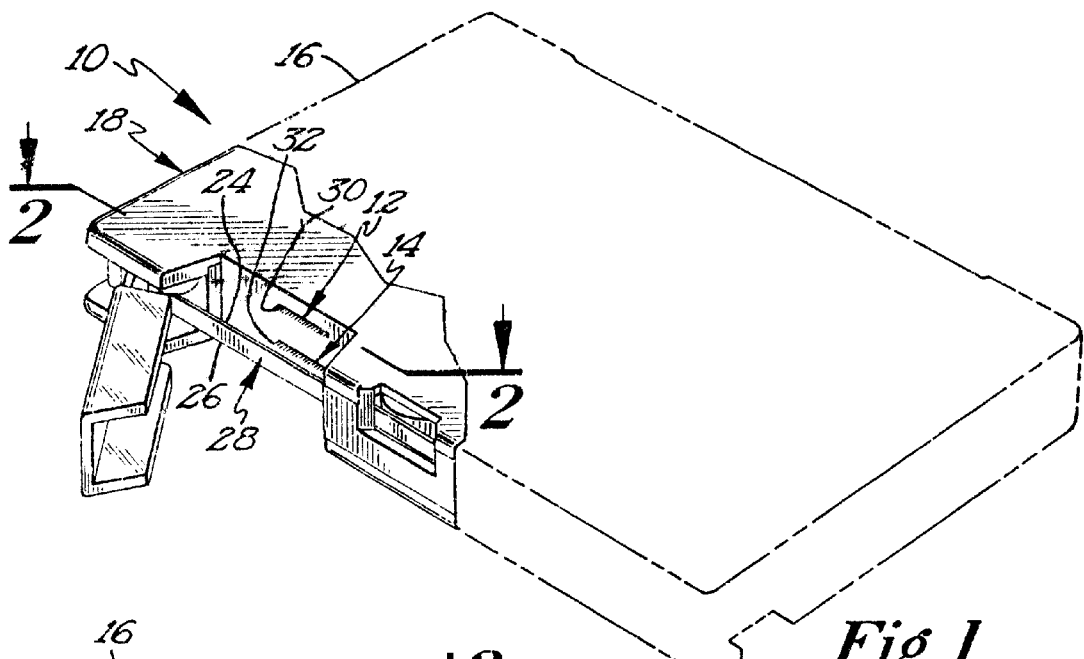
Fig 1
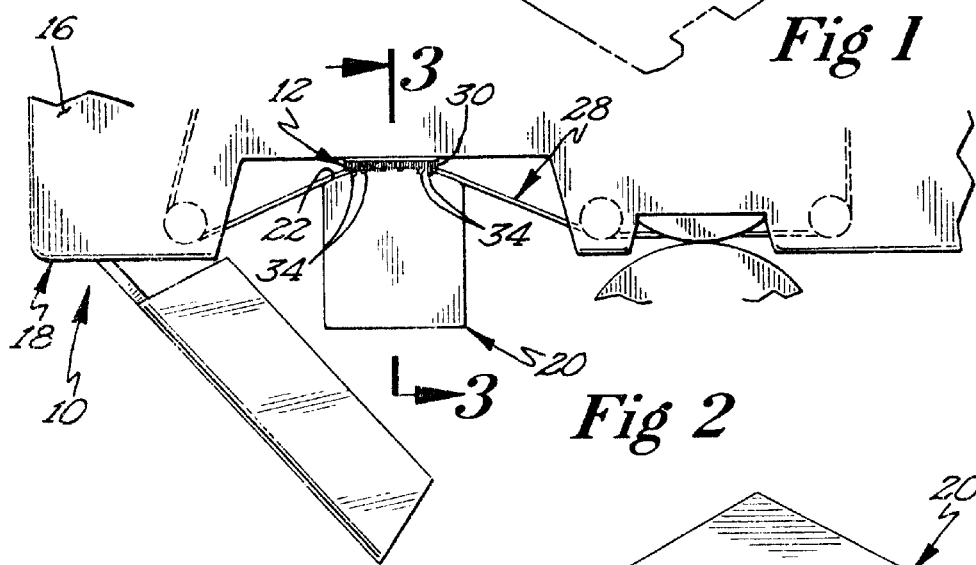
Fig 2
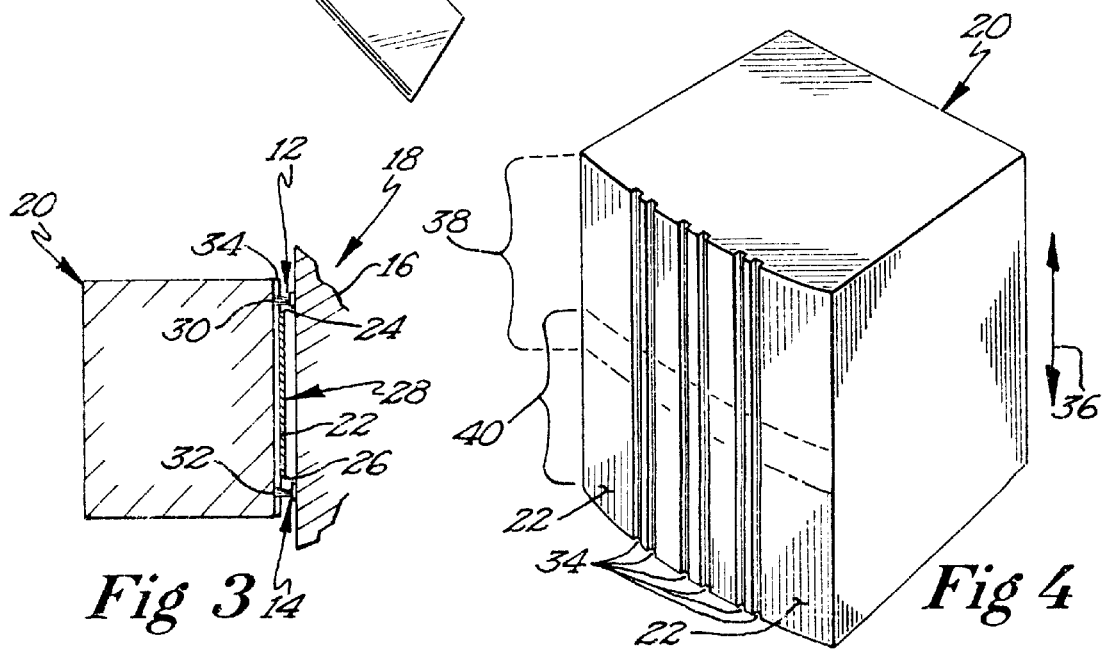
Fig 3
Fig 4

TAPE DRIVE HEAD CLEANING CARTRIDGE HAVING A CLEANING ELEMENT WITH CLEANING SEGMENTS EXTENDING ABOVE AND BELOW A CLEANING TAPE

RELATED APPLICATION

This application is a continuation-in-part of copending application Ser. No. 09/015,869 filed Jan. 29, 1998 pending.

BACKGROUND OF THE INVENTION

The present invention relates generally to an improved cleaning cartridge for cleaning the read/write head of a computer data backup drive, and more specifically to cleaning the air bleed slots in a read/write head.

The subject matter of U.S. Pat. No. 5,541,794 contains a detailed disclosure of a cleaning cartridge of the type discussed herein, and is hereby incorporated by reference herein. Typical tape backup drive systems employ a magnetic media recording tape, the read/write head of the tape drive, and firmware within the tape drive used to initiate proper operation of the drive for backup and for cleaning purposes. Typical magnetic media used in computer data backup tapes have traditionally been constructed of an elongated tape coated with ferric oxide. Recently, backup tapes using a media coating of metal particles have become common. All magnetic media containing coatings have a tendency to generate debris during usage. Magnetic media having metal particle coatings typically shed more debris than ferric oxide magnetic media coatings.

Traditionally, tape drive read/write heads have had contours on the media-contacting portion of the head consisting of smooth bumps with ramps. Recently, many tape drive read/write heads have begun to use heads with media-contacting portions of the head having bumps with sharp edges. These new read/write heads also contain a plurality of substantially vertical slots, known as air bleed slots, which assist in the provision of good read/write head to media tape contact.

Typical magnetic media tape speeds across a read/write head are from 90 to 120 inches per second. When the media tape is moving with such high speed across a read/write head, air may become trapped between the tape and the read/write head, creating an air bearing which adversely affects the quality of contact between the tape and the read/write head. The substantially vertical air bleed slots of a new type read/write head are aligned substantially perpendicular to the direction of motion of the media tape past the read/write head. The sharp edges of the air bleed slots effectively cut the air build up between the read/write head and the tape. The air bleed slots serve to allow this cut air to be dissipated from between the read/write head and the media tape through the slots, allowing a more consistent head to tape contact.

It is well known that a build up of debris within a tape drive can lead to decreased performance and even damage the tape drive. Some of the debris shed by the magnetic media accumulates in the air bleed slots. When these slots become partially or fully filled with debris, they are no longer effective in allowing cut air to bleed away from the interface between the magnetic tape and the read/write head. When this happens, the quality of contact between the tape head and magnetic media is compromised. Traditional cleaning tapes move across the read/write head of a tape drive in a direction substantially perpendicular to the vertical slots. During a cleaning operation, firmware for the drive causes the read/write head to reciprocate vertically up and down. However, even this vertical reciprocation does not allow effective cleaning of the air bleed slots by the cleaning tape because the cleaning tape does not penetrate into the slots. Accordingly, a conventional cleaning tape is inefficient to fully clean the read/write head of a tape drive when the read/write head contains air bleed slots.

It would therefore be desirable to provide a cleaning cartridge capable of not only cleaning the read/write head of a tape drive, but also of cleaning the air bleed slots of a read/write head.

It would also be desirable to provide an apparatus to clean the air bleed slots of a read/write head, wherein the apparatus may be used with existing tape drive cleaning cartridges.

SUMMARY OF THE INVENTION

The present invention overcomes the problems of the prior art by providing an improved cleaning cartridge which not only cleans the read/write head of a tape drive, but also loosens and cleans debris from the air bleed slots of the read/write head. The present invention comprises, in combination with a cleaning cartridge of the type disclosed in U.S. Pat. No. 5,541,794, a stationary cleaning device comprising at least two stationary cleaning elements or segments positioned so as to engage the slots of the read/write head during a cleaning operation and to clean debris from the slots.

The cleaning device is attached to the cleaning cartridge housing and positioned so that the read/write head of the tape drive contacts the stationary cleaning elements or segments during a cleaning operation.

In one embodiment, the cleaning device may comprise two, separate, vertically spaced cleaning elements, one above the cleaning tape and the other below it.

In a preferred embodiment, the cleaning device comprises a single, elongated band or pad having upper and lower cleaning segments extending above and below the cleaning tape.

The stationary cleaning elements and segments are designed so that some portion of each cleaning element and segment extends into a position to come in contact with the substantially vertical air bleed slots in a manner which allows the stationary cleaning device to loosen and or remove debris from the air bleed slots. To accomplish this, the stationary cleaning elements and segments are designed and positioned so that each has associated filaments, fibers or strands of material which extend substantially perpendicularly to the tape contact face of the read/write head of the tape drive during a cleaning operation.

The stationary cleaning device is positioned substantially parallel to the direction of tape movement, and so that each cleaning element or segment provides the cleaning capability for a different section of the read/write head of the computer tape drive. Since the read/write head of the computer tape drive reciprocates vertically during a cleaning operation, the stationary cleaning elements or segments come in contact with the read/write head in such a position to provide effective cleaning of the entire length of the air bleed slots. As the read/write head reciprocates substantially vertically during a cleaning operation, the stationary cleaning elements or segments are swept over a substantially larger section of the head than they would contact if the read/write head did not vertically reciprocate. The reciprocation of the read/write head allows full cleaning coverage of the entire read/write head of a computer tape drive by the stationary cleaning elements or segments.

In order to effect the full coverage of the read/write head of the computer data backup drive by the stationary cleaning device, it is necessary to properly position the cleaning device so that the sections of the read/write head for which the stationary cleaning elements or segments clean the substantially vertical air bleed slots overlap slightly. Knowing the displacement vertically of the read/write head during a cleaning operation allows the effective positioning of the vertically spaced cleaning elements or segments so that the first or upper cleaning element or segment provides cleaning coverage for at least half of the read/write head of the computer data backup drive, and the second or lower cleaning element or segment provides cleaning coverage for at least the other half of the read/write head. Additional cleaning elements and segments could be added in order to further increase the cleaning effectiveness of the present invention. Where a single band or pad cleaning device is used, the band or pad must be wide enough in a vertical direction to define upper and lower cleaning segments extending above and below the cleaning tape.

A variety of materials will provide physical characteristics sufficient to effectively loosen and remove debris from within the air bleed slots without damaging the read/write head. Examples of materials suitable for use as a stationary cleaning device include a single row of nylon threads containing multiple filaments, multiple rows of nylon threads containing multiple filaments, foam, natural brush fibers, sponge, polyester, and the like. An important consideration for determining the material to be used for the stationary cleaning device is that it provides sufficient stiffness and penetration to be able to effectively loosen and clean debris from the substantially vertical air bleed slots of the read/write head of the computer data backup drive. Specific cleaning objectives could be met using varying diameter and number of filaments per thread and other material characteristics. For the embodiment utilizing a single, continuous band or pad of cleaning material a brush pad comprised of a plurality of fibers projecting substantially perpendicularly to the cleaning tape is effective.

During a cleaning operation, the read/write head of the tape drive comes in contact with and displaces the cleaning tape of the cleaning cartridge such as the cartridge described in the incorporated reference. Effective positioning of the cleaning elements or segments at a location on the cleaning cartridge housing inwardly and rearwardly from the normal cleaning tape path will allow the stationary cleaning elements or segments to contact the read/write head when the head is in its optimal cleaning position in which the cleaning tape is displaced somewhat from its non-use position. It is sufficient that the filaments, fibers or strands of the stationary cleaning elements and segments are positioned to enable them to penetrate the air bleed slots and to loosen and clean any accumulated debris therefrom.

It is envisioned that the surface of a cleaning cartridge housing on which the cleaning device elements or segments are mounted may be of differing shapes to maximize effectiveness. For example, the mounting surface may be concave to receive a convex read/write head in conforming relation thereto. Alternatively, the mounting surface could be convex or flat and permit the cleaning elements or segments to engage a convex read/write head so as to ensure positive contact therewith.

In combination with a standard cleaning cartridge for a computer data backup tape drive, the stationary cleaning elements and segments provide a complete apparatus for fully cleaning the tape contact surface and air bleed slots of a read/write head simultaneously.

These and other benefits of the present invention will become apparent from the following detailed description thereof taken in conjunction with the accompanying drawings, wherein like reference numerals designate like elements throughout the several views.

BRIEF DESCRIPTION OF THE DRAWINGS

FIG. 1 is a perspective view of the stationary cleaning elements of the present invention in combination with a cleaning tape and cleaning cartridge;

FIG. 2 is a top view of the cleaning cartridge of FIG. 1 taken along lines 2—2 thereof, and showing the stationary cleaning elements and cleaning tape during a cleaning operation;

FIG. 3 is a section view taken along lines 3—3 of FIG. 2 showing the cleaning tape and stationary cleaning elements during a cleaning operation; and FIG. 4 is a perspective view of a typical read/write head of a computer data backup drive;

DESCRIPTION OF THE PREFERRED EMBODIMENTS

Figure 5:
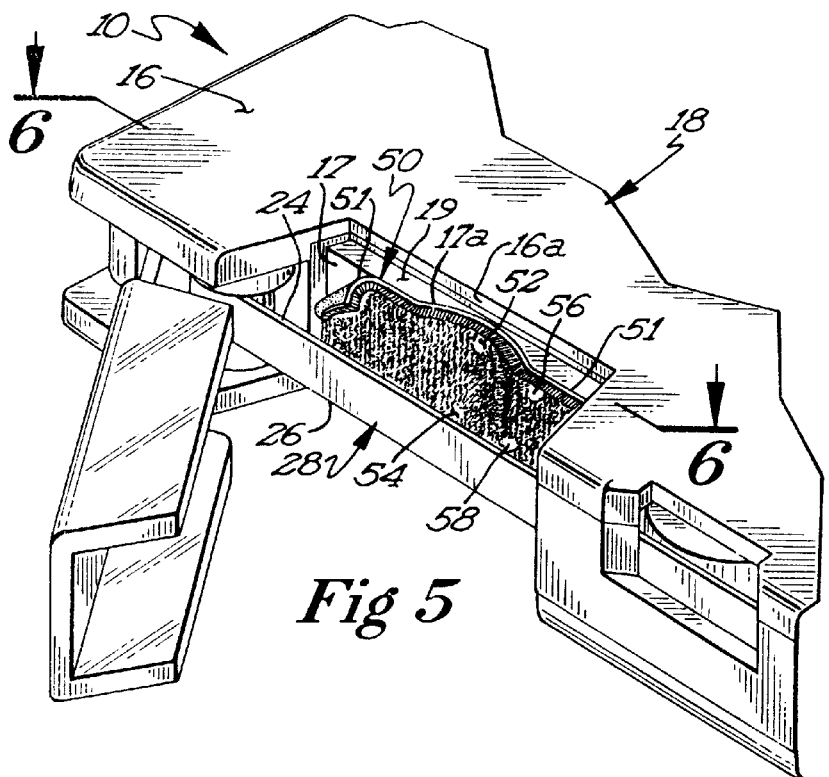
FIG. 5 is a perspective view of an alternative version of cleaning device in combination with a cleaning tape and cleaning cartridge.

Referring now to the drawings, and especially to FIG. 1, the cleaning device 10 is shown in detail. Cleaning device 10 comprises a pair of stationary cleaning elements 12 and 14 attached to the housing 16 of a cleaning cartridge 18. Stationary cleaning elements 12 and 14 are positioned so that when cleaning cartridge 18 is placed in a tape drive for cleaning the read/write head 20 of the tape drive, the stationary cleaning elements 12 and 14 contact the read/write head 20 on its tape contact surface 22. Surface 22 is the surface of the read/write head 20 which contacts the magnetic media tape of a typical computer data backup tape. Cleaning elements 12 and 14 may be seen to be positioned near opposite edges 24 and 26 of cleaning tape 28, respectively. The position of stationary cleaning element 12, near edge 24 of cleaning tape 28, may also be described as being above cleaning tape 28. The position of stationary cleaning element 14, near edge 26 of cleaning tape 28, may also be described as being below cleaning tape 28. This is best seen in FIG. 3. The stationary cleaning elements 12 and 14 are positioned so that both the cleaning tape 28 and the stationary cleaning elements 12 and 14 may contact the read/write head 20 at the same time.

Depending upon the size and position of the cleaning tape 28, additional stationary cleaning elements may be utilized to increase the cleaning effectiveness of the invention 10. The positioning of such additional cleaning elements could be above and below cleaning elements 12 and 14.

Stationary cleaning elements 12 and 14 are attached to the housing 16 of cartridge 18 by any suitable attachment method, including gluing, molding, and the like. As shown in FIG. 1, cleaning elements 12 and 14 are preferably positioned substantially parallel to the direction of motion of cleaning or media tape. The filaments or strands 30 preferably extend substantially perpendicular to the face 22 of read/write head 20, although all that is required is that the filaments or strands 30 are positioned so that they can penetrate slots 34 for cleaning. Suitable attachment of the stationary cleaning elements 12 and 14 to the housing 16 of cartridge 18 requires the cleaning elements 12 and 14 to have their bristles or strands 30 and 32, respectively, extending so that the bristles or strands 30 and 32 can penetrate air bleed slots 34, which extend substantially vertically along tape contact surface 22 of read/write head 20. Slots 34 are typically from eight to twelve thousandths of an inch wide, and three to six thousandths of an inch deep. The air bleed slots 34 are substantially perpendicular to the normal travel direction of a cleaning tape such as cleaning tape 28 or a magnetic media tape used in the tape drive.

During a cleaning operation, read/write head 20 displaces cleaning tape 28 to the position shown in FIG. 2, wherein the cleaning tape 28 and that stationary cleaning elements 12 and 14 are each in direct contact with tape contact surface 22 of read/write head 20. In this position, the filaments or strands 30 and 32 of stationary cleaning elements 12 and 14 respectively, extend into slots 34 of read/write head 20. During a cleaning operation, firmware within the tape drive causes read/write head 20 to reciprocate in the direction shown by arrow 36. The up and down motion of read/write head 20 while the filaments or strands 30 and 32 of stationary cleaning elements 12 and 14 extend into the slots 34 of read/write head 20 allows the filaments 30 and 32 of stationary cleaning elements 12 and 14 to loosen and remove accumulated debris from slots 34 along their entire vertical length.

The positioning of stationary cleaning elements 12 and 14 is such that the reciprocation of read/write head 20 allows the stationary cleaning elements 12 and 14 to loosen and remove debris from the entire vertical length of the slots 34. Read/write head 20 and slots 34 have an upper portion 38 comprising at least the top half of the read/write head 20, tape contact surface 22, and slots 34 (FIG. 4). Read/write head 20 and slots 34 also have a lower portion 40 comprising at least the bottom half of the read/write head 20, tape contact surface 22, and slots 34 (FIG. 4). Upper section 38 and lower section 40 preferably overlap to allow full cleaning coverage of slots 34 by stationary cleaning elements 12 and 14. While this overlapping of the upper section 38 and the lower section 40 is preferable, in order to ensure full cleaning of slots 34 by cleaning elements 12 and 14, sections 38 and 40 need not overlap if the reciprocating motion of read/write head 20 allows the sections 38 and 40 to comprise the full length of the slots 34. Further overlapping sections would be created by use of additional stationary cleaning elements.

The stationary cleaning elements 12 and 14 may be comprised of a variety of materials, provided that the material chosen for stationary cleaning elements 12 and 14 is sufficiently stiff to loosen and remove debris from slots 34 yet flexible enough to effectively penetrate slots 34. The stationary cleaning elements 12 and 14 may comprise a single row of nylon threads containing multiple filaments. These nylon threads may be part of a deconstructed section of woven nylon, or may be individual nylon threads having multiple filaments. Multiple rows of nylon threads containing multiple filaments could also be used. Other materials which are capable of penetrating slots 34 while still providing sufficient stiffness to loosen and remove debris from slots 34 include foam, natural fibers, sponge, polyester, and the like. Differing read/write heads 20 may have different size slots 34. In the embodiment wherein stationary cleaning elements 12 and 14 comprise a single row of nylon threads forming filaments or strands 30 and 32, the thread diameter and/or number of filaments of each thread may be modified to achieve specific cleaning objectives.

Figure 6:
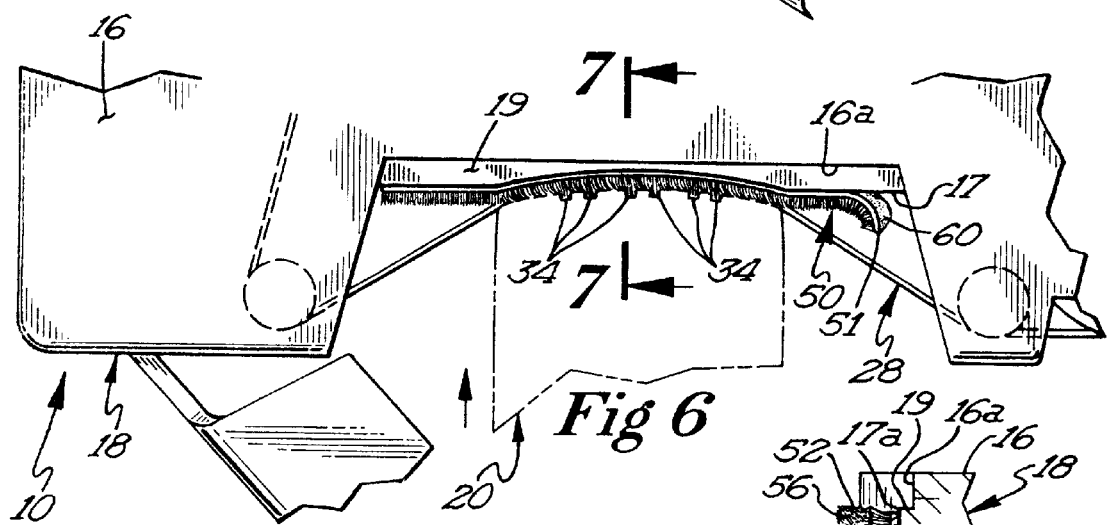
FIG. 6 is a top view taken along lines 6—6 of FIG. 5 and showing the cleaning device and cleaning tape during a cleaning operation.
Figure 7:
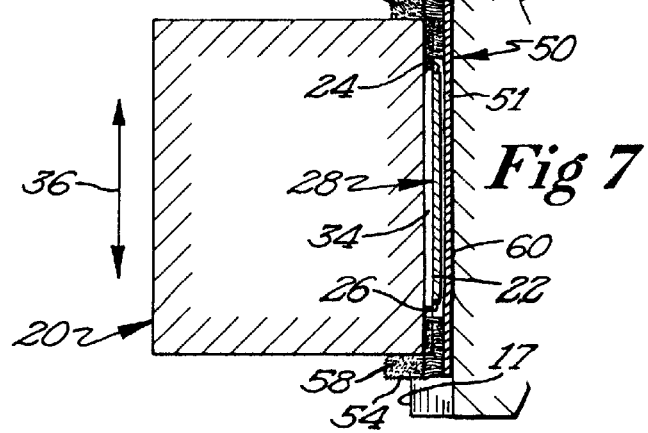
FIG. 7 is a vertical section view taken along lines 7—7 of FIG. 6.

FIGS. 5–7 show an alternative embodiment of a preferred cleaning device. Device 50 is a pad comprised of a plurality of filaments projecting substantially perpendicularly to the plane of the pad and of a mounting surface 17. Preferably, device 50 is a pad of flock material comprised of a plurality of nylon filaments on the order of 0.055" in length impregnated into a backing which is preferably paper 51 as shown in FIG. 6.

Device 50 has a vertical dimension as attached for use against surface 17 so as to provide upper and lower cleaning segments 52 and 54, respectively, which extend above and below the top and bottom edges 24 and 26 of cleaning tape 28. Cleaning element pad 50 may be attached to mounting surface 17 in a variety of ways such as by an adhesive, preferably a double-sided adhesive strip 60, or a molding process.

Cleaning element pad 50 is flexible and will conform to the shape of mounting surface 17. It is envisioned that mounting surface 17 may be flat, concave or convex in a vertical plane. For that purpose, surface 17 is preferably formed as an integrally molded projection 19 from recessed front face 16a of housing 16. Mounting surface 17 may also have a portion 17a which may be concave or convex. Preferably, as most clearly appears in FIG. 6, surface 17 has a concave portion 17a which is so radiused as to provide a concave shape to receive the convex face 22 of read/write head 20 in conforming relationship therewith. This provides positive contact between fibers 56 and 58 and slots 34 when head 20 is pushed in fully against tape 28 as shown in FIGS. 6 and 7.

Stationary cleaning segments 52 and 54 are positioned in a substantially vertical plane displaced rearwardly from the vertical plane in which the cleaning tape is normally disposed. However, when cleaning cartridge 18 is placed in a tape drive for cleaning the read/write head 20 of the tape drive, the stationary cleaning segments 52 and 54 contact the read/write head 20 on its tape contact surface 22. As shown in FIGS. 2 and 5, surface 22 is the surface of the read/write head 20 which contacts the magnetic media tape of a typical computer data backup tape. Cleaning segments 52 and 54 are positioned to extend above and below top and bottom edges 24 and 26 of cleaning tape 28, respectively. This is best seen in FIG. 7. The stationary cleaning segments 52 and 54 are located so that both the cleaning tape 28 and the stationary cleaning segments 52 and 54 will contact the read/write head 20 at the same time during a cleaning operation.

In operation, the device 10 functions as follows. When a cleaning cartridge such as cleaning cartridge 18 is inserted into the tape drive of a computer data backup system, firmware within the tape drive recognizes a cleaning operation. The read/write head 20 of the tape drive comes into contact with and displaces the cleaning tape 28 of cleaning cartridge 18. At the same time, the displacement by the read/write head 20 of cleaning cartridge 18 brings the tape contact surface 22 of read/write head 20 into contact with upper and lower stationary cleaning elements 12 and 14, and more specifically with the filaments or strands 30 and 32 of stationary cleaning elements 12 and 14, respectively. The tape drive firmware initiates a reciprocating up and down motion of read/write head 20, as indicated by motion arrow 36, in order to allow the cleaning tape 28 to fully clean the entire tape contact surface 22 of read/write head 20.

At the same time, the positioning of read/write head 20 causes the filaments or strands 30 and 32 of stationary cleaning elements 12 and 14 to penetrate into slots 34 of the read/write head 20. The reciprocating motion of read/write head 20 causes the filaments or strands 30 and 32 of cleaning elements 12 and 14 to loosen and remove debris along the length of slots 34, cleaning accumulated debris from the slots 34 to prevent the formation of an air bearing which would affect tape to read/write head 20 contact. The cleaning of the read/write head tape contact surface 22 and the slots 34 occurs simultaneously. This allows the cleaning tape 28 not only to clean the tape contact surface 22 of read/write head 20, but also to carry away debris loosened or removed from slots 34 of read/write head 20 by filaments or strands 30 or 32 of stationary cleaning elements 12 and 14.

The operation of the preferred embodiment of the cleaning device 50 shown in FIGS. 5–7 is substantially the same as the operation of the embodiment shown in FIGS. 1–4 as described above. A cleaning operation is recognized by firmware within the tape drive when a cleaning cartridge such as cleaning cartridge 18 is inserted into the tape drive of a computer data backup system. The read/write head 20 of the tape drive moves toward the cleaning cartridge 18 until the tape contact surface 22 comes into contact with upper and lower cleaning segments 52 and 54, and more specifically, with the filaments, fibers or strands 56 and 58 of cleaning segments 52 and 54, respectively. This movement of the read/write head 20 also causes the head 20 to push against the cleaning tape 28 of cleaning cartridge 18, displacing it rearwardly. The tape drive firmware initiates a reciprocating up and down motion of read/write head 20, as indicated by motion arrow 36, allowing the cleaning tape 28 to fully clean the entire tape contact surface 22 of read/write head 20, and further allowing the filaments, fibers or strands 56 and 58 to penetrate and clean the entire vertical lengths of slots 34, thereby preventing the formation of an air bearing.

The principles of the present invention are applicable not only to 5¼ inch and 3½ inch computer data backup drives, but also to the cleaning of any read/write head containing slots in the tape contact surface. Further, although the slots 34 described above are indicated to be substantially vertical, future read/write heads may incorporate slots in a different orientation. All that is necessary to modify the present invention to accomplish effective cleaning of slots of different orientations is to properly reorient the stationary cleaning elements 12 and 14.

The detailed description outlined above is considered to be illustrative only of the principles of the invention. Numerous changes and modification will occur to those skilled in the art, and there is no intention to restrict the scope of the invention to the detailed description. The preferred embodiment having been described in detail the scope of the invention should be defined by the following claims.

What is claimed is:

1. A cleaning cartridge for cleaning a read/write head of a tape drive, the cleaning cartridge having a housing and a supply of cleaning tape positioned to engage the read/write head during use, comprising:

a stationary cleaning device with an upper cleaning segment and a lower cleaning segment attached to a mounting surface on the housing and disposed so as to contact the read/write head during a cleaning operation, said upper segment positioned above the cleaning tape and said lower segment positioned below the cleaning tape whereby the read/write head is cleaned by the upper and lower segments of the stationary cleaning device and the cleaning tape;

wherein said mounting surface is concave to receive a convex read/write head in conforming relation thereto.

2. A cleaning cartridge for cleaning a read/write head of a tape drive the cleaning cartridge having a housing and a supply of cleaning tape positioned to engage the read/write head during use, comprising:

a stationary cleaning device with an upper cleaning segment and a lower cleaning segment attached to a mounting surface on the housing and disposed so as to contact the read/write head during a cleaning operation, said upper segment positioned above the cleaning tape and said lower segment positioned below the cleaning tape whereby the read/write head is cleaned by the upper and lower segments of the stationary cleaning device and the cleaning tape;

wherein said mounting surface is convex to receive a concave read/write head in conforming relation thereto.

3. In combination with a cleaning cartridge for cleaning a read/write head of a tape drive of a computer data backup system, the read/write head vertically reciprocating during a cleaning operation and having a plurality of substantially vertical slots with distinct edges, the slots having upper and lower portions, and the cleaning cartridge having a housing and a supply of cleaning tape positioned to engage the read/write head while moving substantially perpendicular to the head slots during a cleaning operation, the improvement comprising:

a stationary cleaning device with an upper segment and a lower segment attached to a mounting surface on the housing and disposed so as to contact the read/write head during a cleaning operation, said upper segment positioned above the cleaning tape so as to engage the upper portions of the head slots as the read/write head reciprocates vertically and said lower segment positioned below the cleaning tape so as to engage the lower portions of the head slots as the read/write head reciprocates vertically whereby the read/write head is cleaned by the upper and lower segments of the stationary cleaning device.

4. The cleaning cartridge described in claim 3, wherein said cleaning device comprises a single band of material.

5. The cleaning cartridge described in claim 4, wherein the single band of material further comprises filaments projecting substantially perpendicularly to the mounting surface.

6. A cleaning cartridge as described in claim 3, wherein said mounting surface is concave to receive a convex read/write head in conforming relation thereto.

7. A cleaning cartridge as described in claim 3, wherein said mounting surface is convex.

8. A cleaning cartridge as described in claim 3, wherein said mounting surface is flat.

* * * * *